US012151476B2

(12) United States Patent
Yoshita

(10) Patent No.: US 12,151,476 B2
(45) Date of Patent: Nov. 26, 2024

(54) BONDED SUBSTRATE, PIEZOELECTRIC ACTUATOR, LIQUID DISCHARGE HEAD, LIQUID DISCHARGE DEVICE, AND LIQUID DISCHARGE APPARATUS

(71) Applicant: Akio Yoshita, Kanagawa (JP)

(72) Inventor: Akio Yoshita, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 160 days.

(21) Appl. No.: 17/873,174

(22) Filed: Jul. 26, 2022

(65) Prior Publication Data

US 2023/0034778 A1 Feb. 2, 2023

(30) Foreign Application Priority Data

Jul. 30, 2021 (JP) ................................ 2021-125618

(51) Int. Cl.
*B41J 2/14* (2006.01)
*B41J 2/16* (2006.01)

(52) U.S. Cl.
CPC ......... *B41J 2/14233* (2013.01); *B41J 2/1623* (2013.01); *B41J 2002/14491* (2013.01)

(58) Field of Classification Search
CPC .......... B41J 2002/14306; B41J 2/14201; B41J 2/14233; B41J 2/14274
See application file for complete search history.

(56) References Cited

U.S. PATENT DOCUMENTS

| | | | | |
|---|---|---|---|---|
| 2006/0082256 A1* | 4/2006 | Bibl | ........................ | B41J 2/1632<br>257/E27.006 |
| 2021/0370675 A1 | 12/2021 | Yoshita et al. | | |

FOREIGN PATENT DOCUMENTS

| | | | |
|---|---|---|---|
| JP | 2006-095877 | 4/2006 | |
| JP | 2014-177029 | 9/2014 | |
| JP | 2015-126773 | 7/2015 | |
| JP | 2016-165853 | 9/2016 | |
| WO | WO-03049951 A1 * | 6/2003 | ................ B41J 2/14 |

* cited by examiner

*Primary Examiner* — Julian D Huffman
(74) *Attorney, Agent, or Firm* — XSENSUS LLP

(57) ABSTRACT

A bonded substrate includes: a first substrate; and a second substrate having a bonding surface bonded to the first substrate, wherein the second substrate includes a recess having a bottom surface recessed from a surface opposite to the bonding surface, and a difference between the maximum height and the minimum height of the bottom surface from the surface opposite to the bonding surface of the recess is less than 10 μm.

7 Claims, 5 Drawing Sheets

COMPARATIVE EXAMPLE

COMPARATIVE EXAMPLE

BONDED SUBSTRATE, PIEZOELECTRIC ACTUATOR, LIQUID DISCHARGE HEAD, LIQUID DISCHARGE DEVICE, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2021-125618, filed on Jul. 30, 2021, in the Japan Patent Office, the entire disclosure of which is hereby incorporated by reference herein.

BACKGROUND

Technical Field

Aspects of the present disclosure relate to a bonded substrate, piezoelectric actuator, a liquid discharge head, a liquid discharge device, and a liquid discharge apparatus.

Related Art

A bonded substrate includes a first substrate and a second substrate bonded to the first substrate.

The bonded substrate includes a common channel member as a second substrate to be bonded to the first substrate. The first substrate includes an individual channel member, a diaphragm member, and a piezoelectric element. The common channel member includes a supply branch as a recess recessed from a surface of the second substrate opposite to a bonding surface of the second substrate to bonded to the first substrate.

SUMMARY

A bonded substrate includes: a first substrate; and a second substrate having a bonding surface bonded to the first substrate, wherein the second substrate includes a recess having a bottom surface recessed from a surface opposite to the bonding surface, and a difference between the maximum height and the minimum height of the bottom surface from the surface opposite to the bonding surface of the recess is less than 10 μm.

A piezoelectric actuator includes the bonded substrate.

A liquid discharge head includes: the piezoelectric actuator; and a nozzle substrate having multiple nozzles from which a liquid is discharged.

A liquid discharge device includes the liquid discharge head.

A liquid discharge apparatus includes the liquid discharge device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
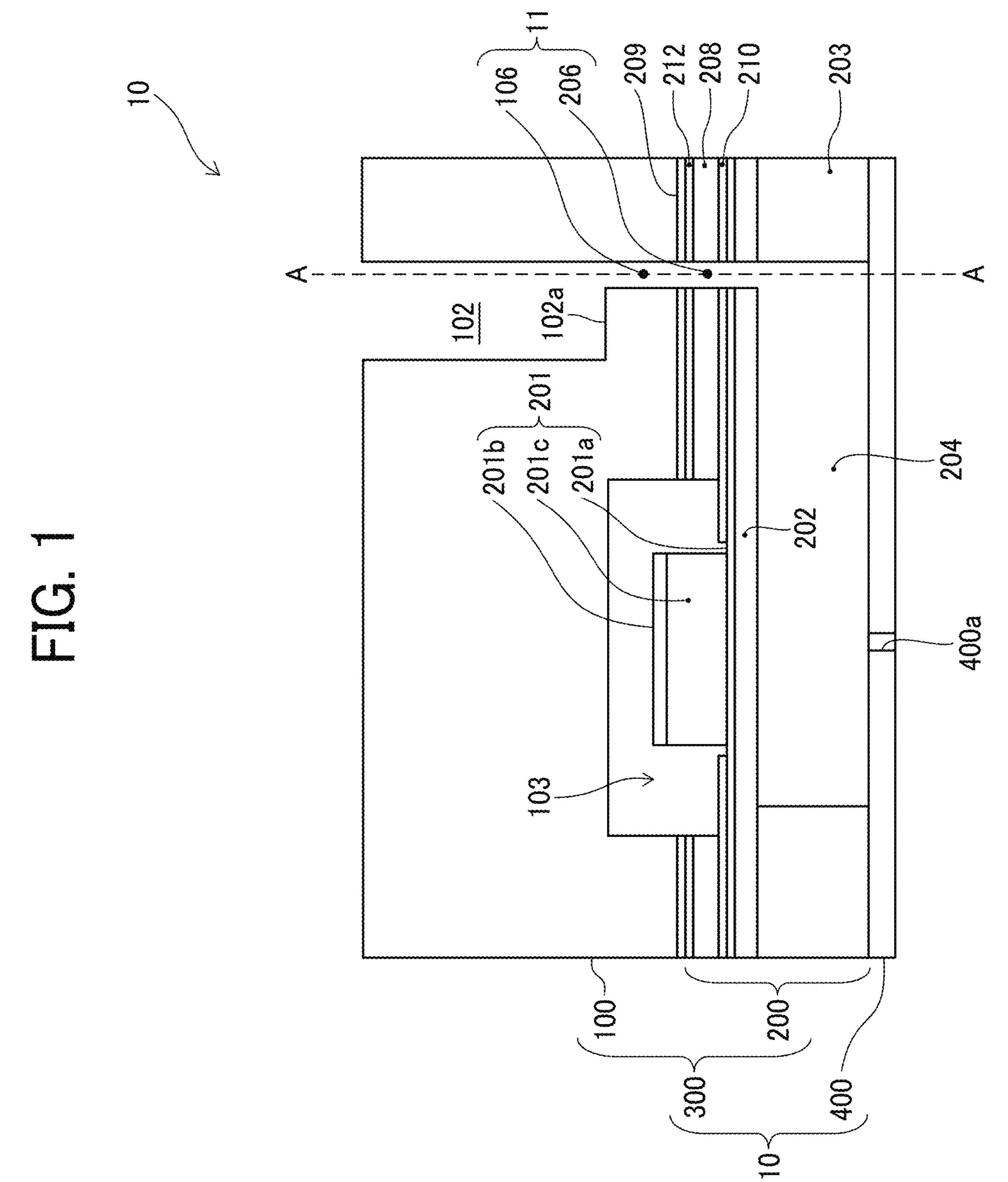
FIG. 1 is a schematic cross-sectional view of a liquid discharge head according to a present embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a”, “an”, and “the” are intended to include the plural forms as well, unless the context clearly indicates otherwise.

It will also be understood that when an element is referred to as being “connected” or “coupled” to another element, it can be directly connected or coupled to another element or intervening elements may be present.

In contrast, when an element is referred to as being “directly connected” or “directly coupled” to another element, there are no intervening elements present. Referring now to the drawings, wherein like reference numerals designate identical or corresponding parts throughout the several views, embodiments of the present disclosure are described below.

Hereinafter, embodiments of bonded substrates are described below. The bonded substrate is used to manufacture a piezoelectric actuator in a liquid discharge head of an inkjet recording apparatus as an image forming apparatus.

First, a configuration of a liquid discharge head 10 is described below. Hereinafter, the “liquid discharge head” is simply referred to as a “head”.

FIG. 1 is a schematic cross-sectional view of the head 10 according to a first embodiment.

The head 10 according to the first embodiment mainly includes a piezoelectric actuator 300 and a nozzle substrate 400. The piezoelectric actuator 300 includes an actuator substrate 200 as a first substrate and a holding substrate 100 as a second substrate. The piezoelectric actuator 300 is manufactured from the bonded substrate formed by bonding the first substrate (actuator substrate 200) and the second substrate (holding substrate 100).

The actuator substrate 200 includes a diaphragm 202, a piezoelectric element 201 as a pressure generator, and a partition wall 203. The piezoelectric element 201 is provided on an element attachment surface (upper surface in FIG. 1) of the diaphragm 202. The piezoelectric elements 201 includes a common-electrode layer 201*a*, an individual-electrode layer 201*b*, and a piezoelectric layer 201*c*.

The common-electrode layer 201*a* serves as a lower electrode. The individual-electrode layer 201*b* serves as an upper electrode. The piezoelectric layer 201*c* is disposed between the common-electrode layer 201*a* and the individual-electrode layer 201*b*. The individual-electrode layer 201*b* may be used as the lower electrode, and the common-electrode layer 201*a* may be used as the upper electrode.

The common-electrode layer 201*a* is formed on the diaphragm 202. The common-electrode layer 201*a* preferably includes a metal film single layer or a multilayer structure of a metal film and an oxide film. In any case, an adhesion layer is preferably inserted between the diaphragm 202 and the metal film to reduce peeling of the common-electrode layer 201*a* from the diaphragm 202, or the like.

The piezoelectric layer 201*c* and an interlayer insulating film 210 are formed on the common-electrode layer 201*a*.

The interlayer insulating film 210 is formed after the piezoelectric layer 201*c* is formed on the common-electrode layer 201*a*. The interlayer insulating film 210 insulates a wiring layer 208 from the common-electrode layer 201*a*. The wiring layer 208 is formed on the interlayer insulating film 21.

The wiring layer 208 formed on the interlayer insulating film 210 is used to connect the individual-electrode layer 201*b* on the piezoelectric layer 201*c* to the driver integrated circuit (driver IC). A passivation film 212 is formed on the wiring layer 108. The passivation film 212 functions as a protective layer of the wiring layer 208. Reference numeral "209" denotes an adhesive layer 209 that bonds the holding substrate 100 and the actuator substrate 200.

The partition wall 203 is provided on a surface (lower surface in FIG. 1) opposite to the element attachment surface of the diaphragm 202. A space surrounded by the diaphragm 202, the partition wall 203, and the nozzle substrate 400 becomes an individual chamber 204. The actuator substrate 200 has a through hole 206 that forms the fluid restrictor 11 serving as a supply channel together with the holding substrate 100.

The holding substrate 100 includes a common chamber 102 and a gap 103. The gap 103 forms a space in which the diaphragm 202 can be deformed and displaced. The holding substrate 100 is bonded to the actuator substrate 200 to form the gap 103. A communication hole 106 communicating with the through hole 206 is formed in a bottom surface 102*a* of the common chamber 102. The fluid restrictor 11 is formed by the through hole 206 of the actuator substrate 200 and the communication hole 106 of the holding substrate 100. The holding substrate 100 may be formed by silicon etching or the like.

The holding substrate 100 is made of a material that transmits infrared rays so that a bonding between the actuator substrate 200 and the holding substrate 100 can be checked and confirmed by an infrared transmission microscope as described below.

The fluid restrictor 11 has a cylindrical shape (circular hole shape), and a diameter of the fluid restrictor 11 is preferably 30 μm or more and 100 μm or less. The diameter of the fluid restrictor 11 is not limited to the above range. The diameter of the fluid restrictor 11 may be appropriately determined depending on a layout of the head 10, a thickness of a wafer such as the actuator substrate 200, and the like.

A depth of the common chamber 102 is a distance from a surface opposite to a bonding surface between the holding substrate 100 and actuator substrate 200 to the bottom surface 102*a*. The depth of the common chamber 102 is preferably 100 μm or more and 300 μm or less. The depth of the common chamber 102 is not limited to a range as described above. The diameter of the fluid restrictor 11 may be appropriately determined depending on a layout of the head 10, a thickness of a wafer such as the actuator substrate 200, and the like. The "surface opposite to a bonding surface" is a top surface of the holding substrate 100 in FIGS. 4A and 5.

The head 10 has nozzles 400*a* formed at positions respectively corresponding to the individual chambers 204 in the nozzle substrate 400. The nozzle substrate 400 may be formed by punching, etching, silicon etching, nickel electroforming, resin laser processing, or the like on a plate made of steel use stainless (SUS), for example.

The head 10 according to the first embodiment applies voltage signals from the drive ICs to each of the individual-electrode layers 201*b* under the control of a controller in a state in which the individual chambers 204 are filled with ink. As the drive voltage signal, a pulse voltage generated by an oscillation circuit may be used.

With an application of the pulse voltage to the piezoelectric layer 201*c*, the piezoelectric layer 201*c* contracts in a direction parallel to the diaphragm 202 due to a piezoelectric effect. As a result, the diaphragm 202 bends and protrude toward the individual chamber 204 side (downward in FIG. 1). Thus, a pressure in the individual chamber 204 rapidly rises, and ink is discharged from the nozzles 400*a* communicating with the individual chamber 204.

After the pulse voltage is applied to the piezoelectric layer 201*c*, the piezoelectric layer 201*c* returns from a shrank position to an original position. Accordingly, the deformed (deflected) diaphragm 20 also returns from a shrank position to an original position. Thus, an interior of the individual chamber 204 becomes a negative pressure as compared with a pressure inside the common chamber 102.

Thus, the ink supplied from an ink cartridge via an ink supply port is supplied to the individual chamber 204 via the common chamber 102 and the fluid restrictor 11. Repeating such operation allows liquid droplets to be continuously discharged. Thus, an image is formed on a recording material such a sheet of paper placed to face the head 10.

In the head 10, the first substrate (actuator substrate 200) is bonded to the nozzle substrate 400, and the first substrate (actuator substrate 200) having a through hole 206, includes: multiple individual chambers 204 respectively communicating with the multiple nozzles 400*a*; and multiple pressure generators (piezoelectric element 201) respectively generating pressures in the multiple individual chambers 204, and the second substrate (holding substrate 100) includes a common chamber 102 defined by the recess (102), the common chamber 102 configured to supply a liquid to be supplied to each of the multiple individual chambers 204, and the bottom surface 102*a* of the recess (common chamber 102) of the second substrate (holding substrate 100) has a communication hole 106 communicating with the through hole 206 to form a supply channel communicating with the common chamber 102 and each of the multiple individual chambers 204.

In a head according to a comparative example, the holding substrate 100, the actuator substrate 200, and the nozzle substrate 400 forms the common chamber 102. Further, a fluid restrictor is formed in the partition wall 203 of the actuator substrate 200. Specifically, a part of the nozzle substrate 400 serves as a bottom surface of the common chamber 102, and the fluid restrictor is provided between the individual chamber 204 of the partition wall 203 and the common chamber 102. In this comparative example, the individual chamber 204 has to obtain a desired pressure when the diaphragm 202 is deformed in a concave direction. Thus, it is not easy to change a volume of the individual chamber 204. Therefore, it is not easy to secure a channel length for obtaining a desired channel resistance as the fluid restrictor when a size of the head 10 is reduced.

Conversely, the head 10 according to the first embodiment includes the communication hole 106 that forms a part of the fluid restrictor 11 in the holding substrate 100. Even if the size (ink capacity) of the common chamber 102 is slightly increased or decreased by a length of the communication hole 106, the discharge performance is not affected. Therefore, it is possible to easily secure a channel length for obtaining a desired channel resistance as the fluid restrictor.

Figure 2:
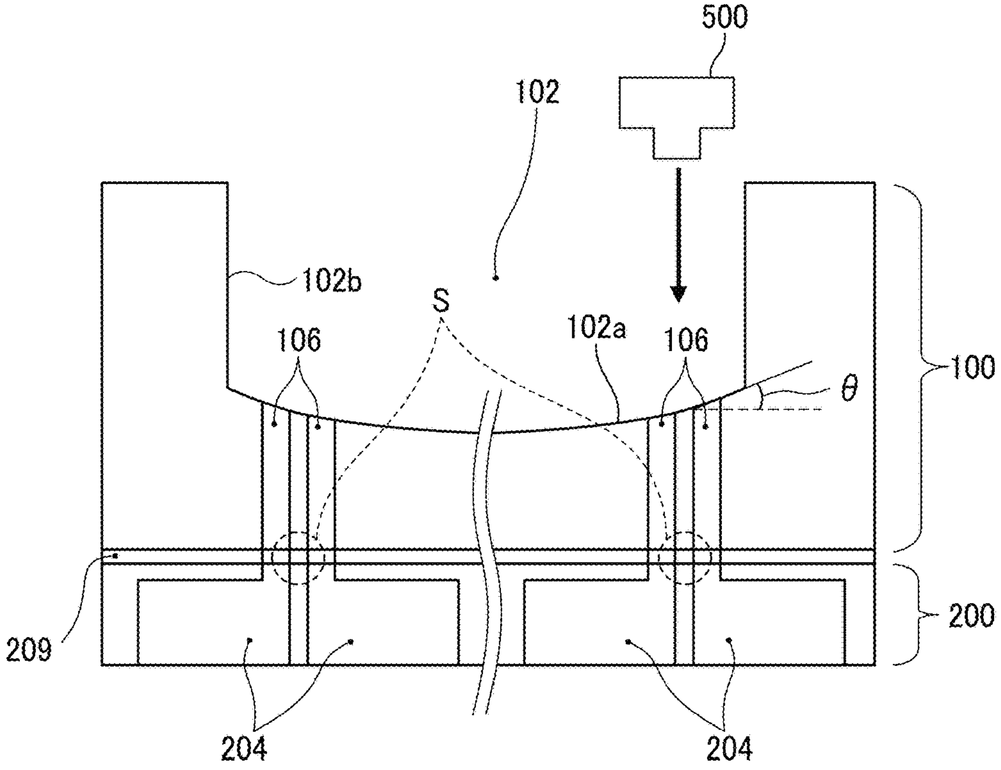
FIG. 2 is a schematic cross sectional view of a holding substrate of a bonded substrate in a comparative example.

FIG. 2 is a schematic cross-sectional view of a bonded substrate formed by bonding a holding substrate 100 to an actuator substrate 200 in the comparative example.

FIG. 2 is a cross-sectional view along line "A-A" in FIG. 1. In FIG. 2, a concave shape of the bottom surface 102*a* is emphasized for easy understanding of the comparative example.

The common chamber 102 of the holding substrate 100 of the bonded substrate in the comparative example is formed by silicon etching. Depending on processing conditions in silicon etching, a central portion of the bottom surface 102*a* of the common chamber 102 may have a concaved (recessed) shape concaved (recessed) by about several tens of μm.as illustrated in FIG. 2. In the comparative example, the bottom surface 102*a* of the supply branch serving as the common chamber may be seemed to be planar. However, when an image of the bottom surface 102*a* is enlarged, the bottom surface 102*a* of the supply branch may have a concave (recessed) shape concaved (recessed) by about several tens of μm.

After the holding substrate 100 is bonded to the actuator substrate 200 with an adhesive, a bonding portion between the holding substrate 100 and the actuator substrate 200 has to be checked (bonding checking process) to ensure that ink does not leak from the bonding portion. The holding substrate 100 and the actuator substrate 200 are bonded with each other in the bonding portion.

Specifically, the bonding checking process has to be performed on a bonding checking region indicated by "S" surrounded by a dashed circle in FIG. 2 to ensure that ink leakage does not occur. The bonding checking region S is a region between two communication holes 106 of the fluid restrictors 11 adjacent (closed) to each other. The bonding checking region is in a part of the bonding portion.

The bonding portion between the holding substrate 100 and the actuator substrate 200 around the fluid restrictor 11 is not visually recognizable. Thus, an infrared transmission microscope 500 is used to check the bonding portion (bonding checking process). As described above, the holding substrate 100 is made of a material that transmits infrared light.

Therefore, the bonding portion between the holding substrate 100 and the actuator substrate 200 is imaged through the bottom surface 102*a* of the common chamber 102 of the holding substrate 100 by the infrared transmission microscope 500. Then, it is checked and confirmed whether air bubbles (voids) are present (existed) in the bonding checking region S based on the image captured by the infrared transmission microscope 500. When the air bubbles are present (existed) in the bonding checking region S, it is determined that the bonding is defective.

Figure 3:
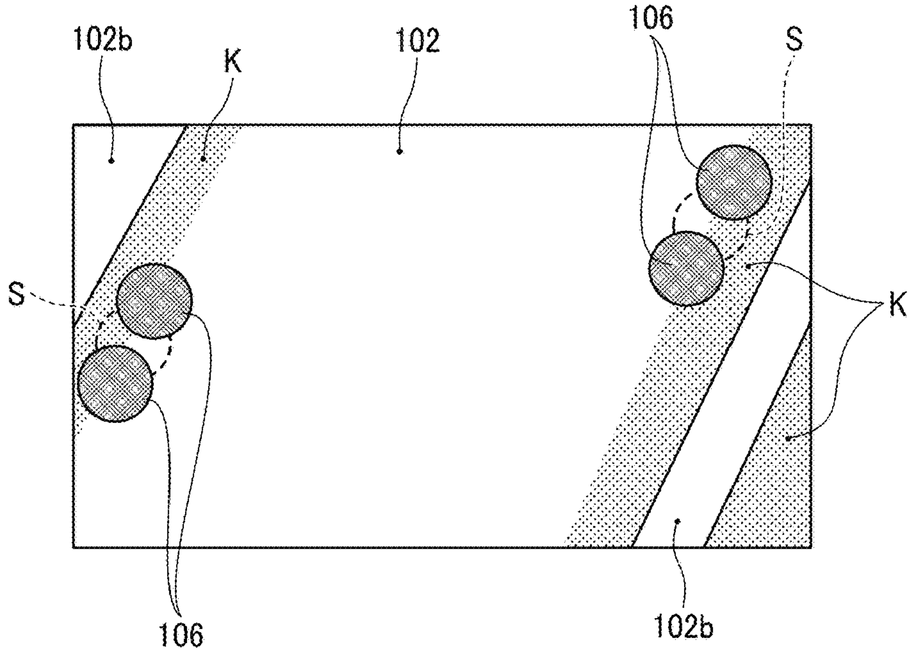
FIG. 3 is a schematic plan view of a captured image of the bonded substrate in the comparative example illustrated in FIG. 2 taken (captured) by an infrared transmission microscope.

FIG. 3 is a schematic plan view of a captured image of the bonded substrate in the comparative example illustrated in FIG. 2 taken (captured) by the infrared transmission microscope 500.

When a difference in a height between the maximum height and the minimum height of a concave (recessed) shape of the bottom surface 102*a* from a surface (upper surface in FIG. 2) opposite to the bonding surface of the common chamber 102 is large, an unclear portion K occurs in a vicinity of the sidewall 102*b* of the common chamber 102 in the image captured by the infrared transmission microscope 500 as illustrated in FIG. 3. Since such an unclear portion K is occurred, it may be difficult to check (confirm) an existence of bubbles in the bonding checking region S.

Two communication holes 106 on the left side in FIG. 3 communicate with the individual chambers corresponding to the nozzles 400*a* of one of two nozzle arrays formed in the nozzle substrate 400. On the other hand, two communication holes 106 on the right side in FIG. 3 communicate with the individual chambers corresponding to the nozzles 400*a* of another of two nozzle arrays formed in the nozzle substrate 400.

When a difference in height in the bottom surfaces 102*a* of the common chamber 102 is large, an inclination θ (slope) of the bottom surface 102*a* in a vicinity of a sidewall 102*b* of the common chamber 102 becomes steep as illustrated in FIG. 2. In such the bottom surfaces 102*a* in the vicinity of the sidewall 102*b* of the common chamber 102 having such a steep inclination θ, the infrared light reflected at the bonding portion is largely refracted when the infrared light passes through the bottom surface 102*a* of the common chamber 102.

As a result, the infrared light travels in a direction different from the direction toward an imaging element of the infrared transmission microscope 500, and the infrared light incident on the imaging element is reduced. Thus, as illustrated in FIG. 3, the captured image taken (captured) by the infrared transmission microscope 500 becomes unclear in the vicinity of the sidewall 102*b* of the common chamber 102 at which a height of the bottom surface 102*a* of the common chamber 102 is higher than a height at a center of the bottom surface 102*a* of the common chamber 102.

Therefore, the difference between the maximum height and the minimum height of the bottom surface 102*a* from the surface (upper surface in FIG. 4B) opposite to the bonding surface of the common chamber 102 is less than 10 μm, more preferably 6 μm or less in the head 10 according to the present embodiment. Thus, the head 10 according to the present embodiment can reduce generation of the unclear portion K in the bonding checking region S in the image captured by the infrared transmission microscope 500.

FIG. 4 is a schematic cross-sectional view of the holding substrate 100 according to the present embodiment.

Figure 4A:
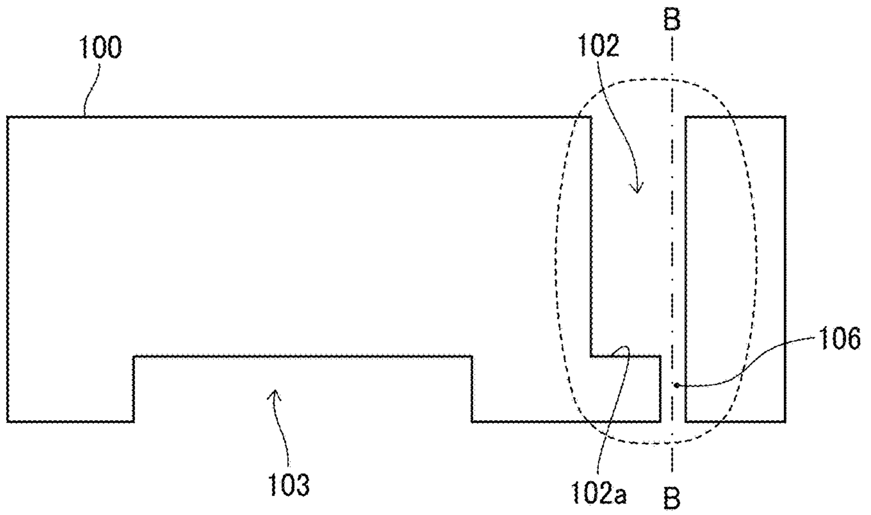
FIGS. 4A and 4B are schematic cross-sectional views of the holding substrate according to the present embodiment.
Figure 5:
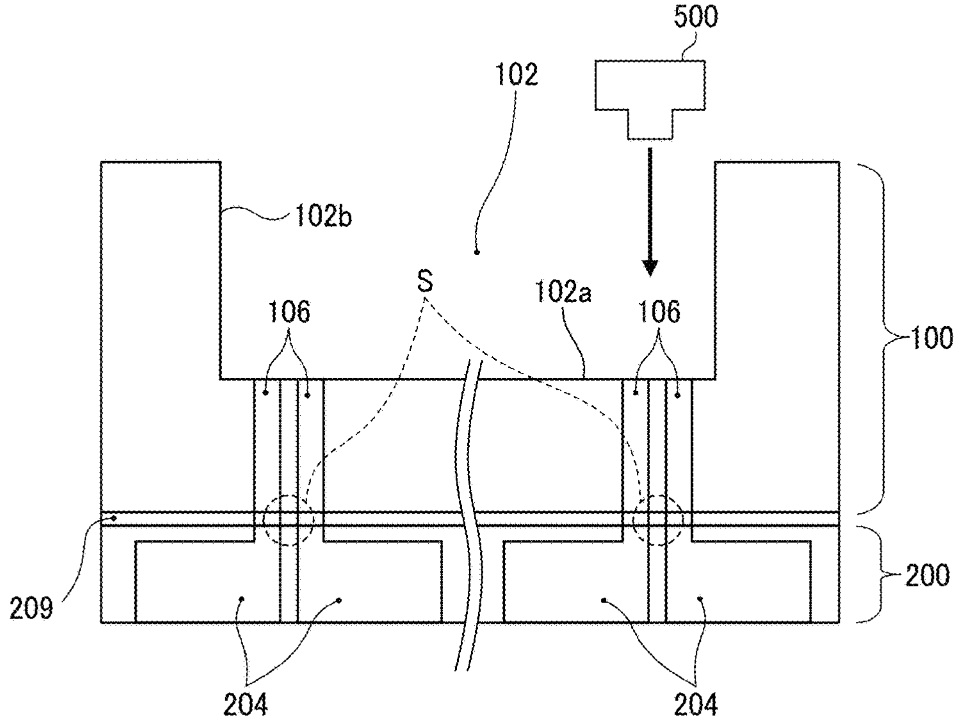
FIG. 5 is a schematic cross-sectional view of the holding substrate according to the present embodiment along one dot chain line B in FIG. 4A.

FIG. 5 is a schematic cross-sectional view of the holding substrate 100 according to the present embodiment along one dot chain line "B" in FIG. 4A.

Figure 4B:
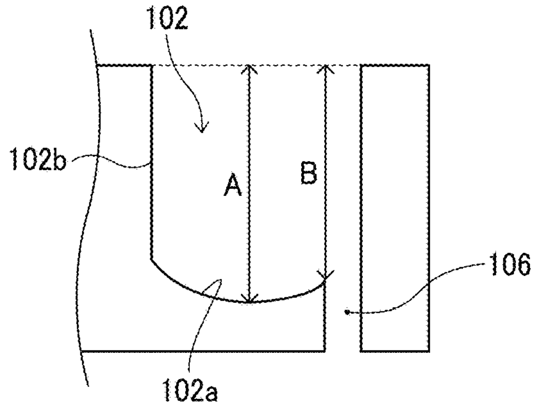

As illustrated in FIGS. 4A and 4B, the head 10 according to the present embodiment has the bottom surface 102*a* of the common chamber 102 in which a difference $|A-B|$ between a maximum distance "A" and a minimum distance "B" is less than 10 μm ($|A-B|<10$ μm). The maximum distance A is the largest distance from the surface (upper surface in FIG. 4B) opposite to the bonding surface of the holding substrate 100 to the bottom surface 102*a*. The minimum distance B is the smallest distance from the surface (upper surface in FIG. 4B) opposite to the bonding surface to the bottom surface 102*a*. In this example, the height of the bottom surface 102*a* is determined based on the surface of the holding substrate 100 opposite to the bonding surface of the holding substrate 100 to be bonded to the actuator substrate 200. The height of the bottom surface 102*a* may be determined based on the bonding surface of the holding substrate 100 to the actuator substrate 200.

Thus, a bonded substrate (300) includes: a first substrate (actuator substrate 200); and a second substrate (holding substrate 100) having a bonding surface bonded to the first substrate(actuator substrate 200), wherein the second substrate (holding substrate 100) includes a recess (common chamber 102) having a bottom surface 102*a* recessed from a surface opposite to the bonding surface, and a difference between the maximum height and the minimum height of the bottom surface 102*a* from the surface (upper surface in FIG. 4B) opposite to the bonding surface of the recess (common chamber 102) is set to be less than 10 μm. The recess (102) forms the common chamber 102.

In the above-described manner, the difference in height of the bottom surface 102*a* is less than 10 μm so that the inclination θ of the bottom surface 102*a* in the bonding checking region S illustrated in FIG. 5 can be reduced to an acceptable range. Thus, the infrared light reflected at the bonding portion passes through the bottom surface 102*a* with almost no refraction (little refraction) at the bonding portion. Thus, the imaging element of the infrared transmission microscope 500 can satisfactorily receive the infrared light reflected at the bonding portion.

Thus, the head 10 can reduce an unclear portion occurred in an image captured by the infrared transmission microscope 500. Accordingly, it is possible to easily check whether the bubbles (voids) exist in the bonding checking region S from the image captured by the infrared transmission microscope 500. Thus, it becomes easy to perform the bonding checking process on the head 10 according to the present embodiment.

After the holding substrate 100 is etched to the vicinity of the bottom surface 102*a* of the common chamber 102, the etching conditions is changed to reduce a difference in height of the bottom surface 102*a* of the common chamber 102 to less than 10 μm.

In the head 10 according to the present embodiment, the entire bottom surface 102*a* is substantially flat. However, at least the fluid restrictor of the bottom surface 102*a* (at least in a periphery of the communication hole 106) may be substantially flat. That is, the difference in height of the bottom surface 102*a* is less than 10 μm. Such a configuration of the head 10 can make, at least the bonding checking region S of the captured image of the infrared transmission microscope 500, clear.

Thus, the whether the air bubbles are existed can be easily checked, and bonding can be easily checked (confirmed) in the head 10 according to the present embodiment. In consideration of the time and effort of processing the holding substrate 100, it is preferable to form the entire bottom surface 102*a* substantially flat, that is a height difference is preferably less than 10 μm.

Table 1 below illustrates results of evaluation of ease of checking air bubbles in the bonding checking region S for three bonded substrates having different height differences in the bottom surface 102*a*. Here, the actuator substrate 200 and the holding substrate 100 are bonded to form the bonded substrate. The fluid restrictor 11 has a shape of a round hole with a diameter of 70 μm.

TABLE 1

| MAGNIF- | LEVEL OF HEIGHT DIFFERENCE | | |
|---|---|---|---|
| ICATION | 1 μm | 6 μm | 10 μm |
| TEN TIMES (×10) | EXISTENCE OF AIR BUBBLES COULD NOT DETERMINED | EXISTENCE OF AIR BUBBLES COULD NOT DETERMINED | EXISTENCE OF AIR BUBBLES COULD NOT DETERMINED |
| TWENTY TIMES (×20) | GOOD | GOOD | POOR |

As illustrated in Table 1, when a magnification of the infrared transmission microscope 500 was ten times (×10), the magnification was too low to determine the existence of air bubbles in the bonding checking region S. On the other hand, when the magnification of the infrared transmission microscope 500 was twenty times (×20), it was easily to check whether air bubbles existed in the bonding checking region S from the image captured by the infrared transmission microscope 500 for the bonded substrate in which the difference in height of the bottom surface 102*a* was 1 μm, and for the bonded substrate in which the difference in height of the bottom surface 102*a* was 6 μm. Therefore, a bonding checking evaluation for evaluation of the bonding portion was evaluated as "GOOD".

On the other hand, the image captured in the vicinity of the bonding checking region S by the infrared transmission microscope 500 becomes unclear for the bonded substrate in which the difference in height of the bottom surface 102*a* was 10 μm. Thus, it was not easy to check the existence of air bubbles in the bonding check region S for the bonded substrate in which the difference in height of the bottom surface 102*a* was 10 μm. Therefore, the bonding checking evaluation was evaluated as "POOR".

From the above, it was confirmed that the difference in height of the bottom surface 102*a* has to be at least less than 10 μm, and preferably 6 μm or less.

Next, an example of the liquid discharge apparatus 1000 according to an embodiment of the present disclosure is described with reference to FIGS. 6 and 7.

Figure 6:
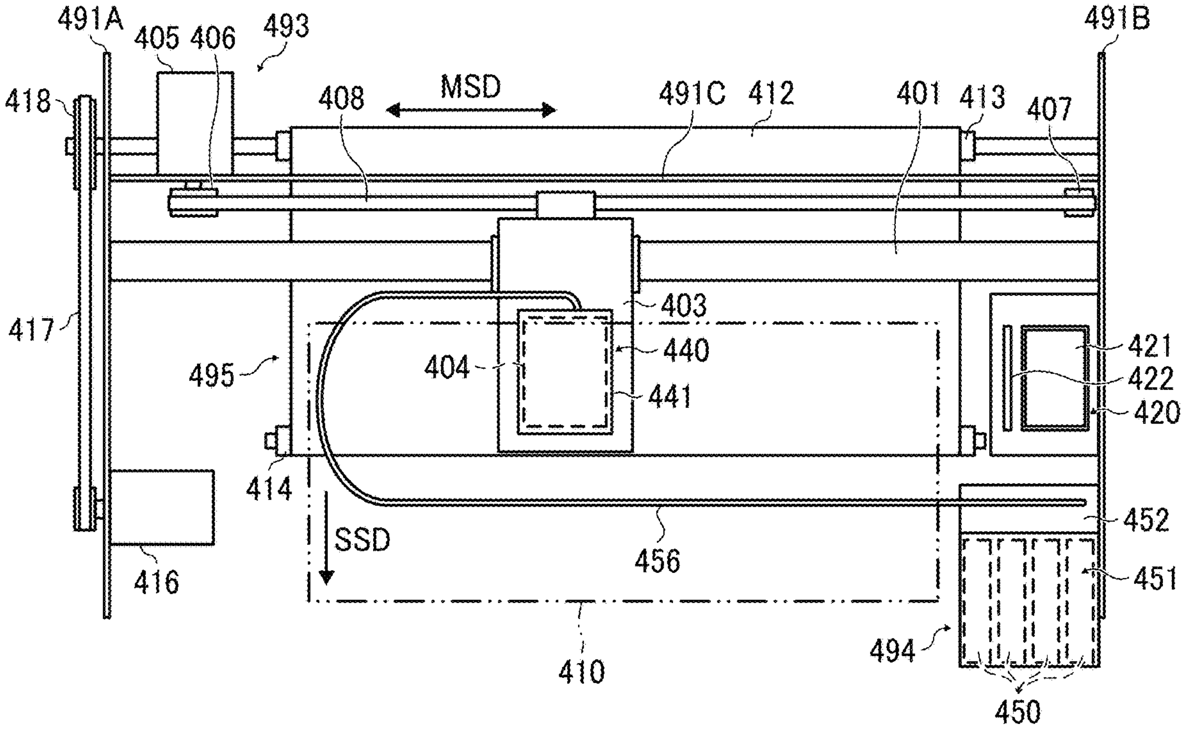
FIG. 6 is a plan view of an example of a portion of a liquid discharge apparatus according to the present embodiment.

FIG. 6 is a plan view of a portion of the liquid discharge apparatus 1000.

Figure 7:
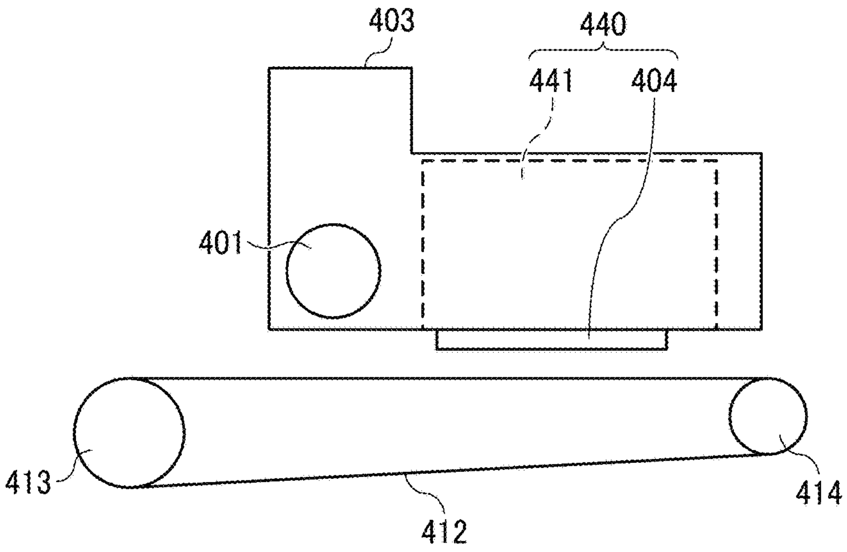
FIG. 7 is a schematic side view of an example of a liquid discharge device according to the present embodiment.

FIG. 7 is a side view of a portion of the liquid discharge apparatus 1000 of FIG. 6.

The liquid discharge apparatus 1000 is a serial type apparatus, and the carriage 403 reciprocally moves in the main scanning direction MSD by the main scan moving unit 493. The main scan moving unit 493 includes a guide 401, a main scan motor 405, a timing belt 408, and the like. The guide 401 is bridged between a left-side plate 491A and a right-side plate 491B to moveably hold the carriage 403. The main scan motor 405 reciprocally moves the carriage 403 in the main scanning direction MSD via the timing belt 408 bridged between a drive pulley 406 and a driven pulley 407.

The carriage 403 mounts the liquid discharge device 440. The head 404 (head) according to the above-described embodiments of the present disclosure and the head tank 441 form the liquid discharge device 440 as a single unit. The head 404 of the liquid discharge device 440 discharges liquid of each color, for example, yellow (Y), cyan (C), magenta (M), and black (K).

Figure 8:
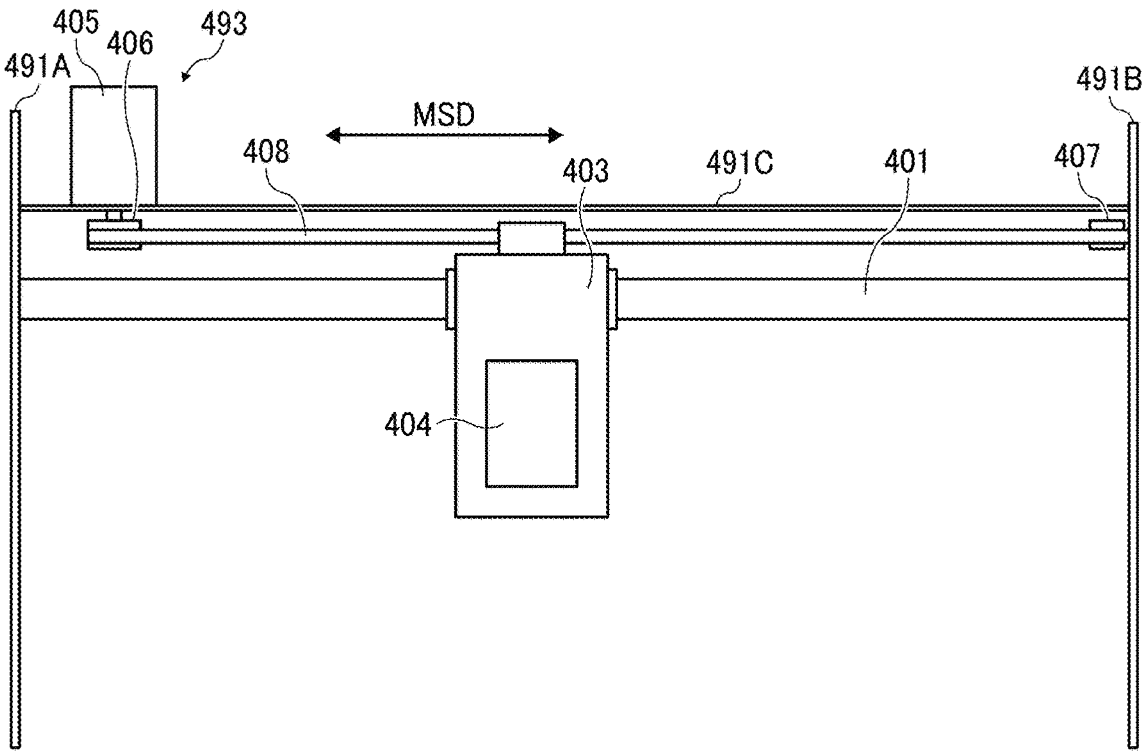
FIG. 8 is a schematic plan view of a portion of another example of the liquid discharge device according to the present embodiment.

The head 404 includes a nozzle array including multiple nozzles 400*a* arrayed in row in a sub-scanning direction indicated by arrow "SSD" in FIG. 8. The head 404 is mounted to the carriage 403 so that ink droplets are discharged downward. The sub-scanning direction SSD is orthogonal to the main scanning direction MSD.

The liquids stored in liquid cartridges 450 are supplied to the head tank 441 by a supply unit 494 to supply the liquids stored outside the head 404 to the head 404.

The supply unit 494 includes a cartridge holder 451 serving as a filling part to mount the liquid cartridges 450, a tube 456, a liquid feeder 452 including a liquid feed pump, and the like. The liquid cartridge 450 is detachably attached to the cartridge holder 451. The liquid is fed from the liquid cartridge 450 to the head tank 441 by the liquid feeder 452 via the tube 456.

The liquid discharge apparatus 1000 includes a conveyor 495 to convey a sheet 410. The conveyor 495 includes a conveyance belt 412 as a conveyor and a sub scan motor 416 to drive the conveyance belt 412.

The conveyance belt 412 attracts the sheet 410 and conveys the sheet 410 to a position facing the head 404. The conveyance belt 412 is an endless belt stretched between a conveyance roller 413 and a tension roller 414. Attraction of the sheet 410 to the conveyance belt 412 may be applied by electrostatic adsorption, air suction, or the like.

The conveyance belt 412 rotates in the sub scanning direction SSD as the conveyance roller 413 is rotationally driven by the sub scan motor 416 via the timing belt 417 and the timing pulley 418.

At one side in the main scanning direction MSD of the carriage 403, a maintenance unit 420 to maintain the head 404 in good condition is disposed on a lateral side of the conveyance belt 412.

The maintenance unit 420 includes, for example, a cap 421 to cap a nozzle surface of the head 404, a wiper 422 to wipe the nozzle surface, and the like. The nozzle surface is an outer surface of the head 404 on which the nozzles 400*a* are formed.

The main scan moving unit 493, the supply unit 494, the maintenance unit 420, and the conveyor 495 are mounted to a housing that includes a left-side plate 491A, a right-side plate 491B, and a rear-side plate 491C.

In the liquid discharge apparatus 1000 thus configured, the sheet 410 is conveyed on and attracted to the conveyance belt 412 and is conveyed in the sub scanning direction SSD by the cyclic rotation of the conveyance belt 412.

The head 404 is driven in response to image signals while the carriage 403 moves in the main scanning direction MSD, to discharge a liquid to the sheet 410 stopped, thus forming an image on the sheet 410.

As described above, the liquid discharge apparatus 1000 includes the head 404 according to the above-described embodiments of the present disclosure, thus allowing stable formation of high quality images.

Next, the liquid discharge device 440 according to another embodiment of the present disclosure is described with reference to FIG. 8.

FIG. 8 is a plan view of a portion of the liquid discharge device 440 according to another embodiment of the present disclosure.

The liquid discharge device 440 includes a housing, the main scan moving unit 493, the carriage 403, and the head 404 among components of the liquid discharge apparatus 1000. The left-side plate 491A, the right-side plate 491B, and the rear-side plate 491C configure the housing.

The liquid discharge device 440 may be configured to further attach at least one of the above-described maintenance unit 420 and the supply unit 494 to, for example, the right-side plate 491B of the liquid discharge device 440.

Next, still another example of the liquid discharge device 440 according to the present embodiment is described with reference to FIG. 9.

Figure 9:
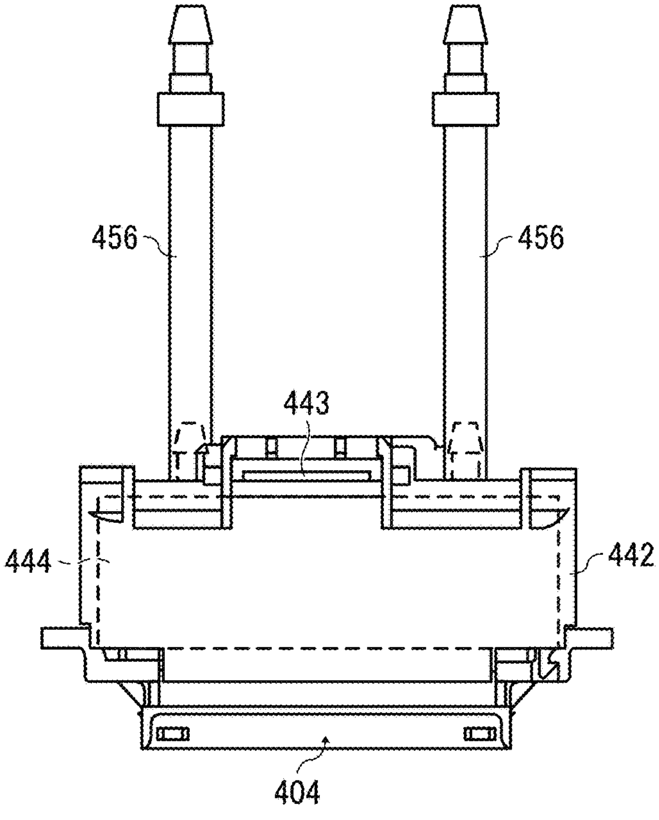
FIG. 9 is a front view of still another example of the liquid discharge device according to the present embodiment.

FIG. 9 is a front view of still another example of the liquid discharge device 440.

The liquid discharge device 440 includes the head 404 to which a channel part 444 is attached and a tube 456 connected to the channel part 444.

Further, the channel part 444 is disposed inside a cover 442. Instead of the channel part 444, the liquid discharge device 440 may include the head tank 441. A connector 443 electrically connected with the head 404 is provided on an upper part of the channel part 444.

In the above-described embodiments, the "liquid discharge apparatus" includes the head or the liquid discharge device and drives the head to discharge a liquid. The liquid discharge apparatus may be, for example, an apparatus capable of discharging liquid to a material onto which liquid can adhere and an apparatus to discharge liquid toward gas or into liquid.

The "liquid discharge apparatus" may include devices to feed, convey, and eject the material on which liquid can adhere. The liquid discharge apparatus may further include a pretreatment apparatus to coat a treatment liquid onto the material, and a post-treatment apparatus to coat a treatment liquid onto the material, onto which the liquid has been discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns, or fabricate three-dimensional images.

The above-described term "material on which liquid can adhere" represents a material on which liquid is at least temporarily adhered, a material on which liquid is adhered and fixed, or a material into which liquid is adhered to permeate. Examples of the "material onto which liquid can adhere" include recording media such as a paper sheet, recording paper, and a recording sheet of paper, film, and cloth, electronic components such as an electronic substrate and a piezoelectric element, and media such as a powder layer, an organ model, and a testing cell. The "material onto which liquid can adhere" includes any material on which liquid adheres unless particularly limited.

Examples of the "material on which liquid can adhere" include any materials on which liquid can adhere even temporarily, such as paper, thread, fiber, fabric, leather, metal, plastic, glass, wood, ceramic, construction materials (e.g., wallpaper or floor material), and cloth textile.

Examples of the "liquid" include ink, treatment liquid, DNA sample, resist, pattern material, binder, fabrication liquid, and solution or liquid dispersion containing amino acid, protein, or calcium.

The "liquid discharge apparatus" may be an apparatus to relatively move the head and a material on which liquid can adhere. However, the liquid discharge apparatus is not limited to such an apparatus. For example, the liquid discharge apparatus may be a serial head apparatus that moves the head or a line head apparatus that does not move the head.

Examples of the "liquid discharge apparatus" further include a treatment liquid coating apparatus to discharge a treatment liquid to a sheet surface to coat the sheet surface with the treatment liquid to reform the sheet surface and an injection granulation apparatus to discharge a composition liquid including a raw material dispersed in a solution from a nozzle to mold particles of the raw material.

The "liquid discharge device" is an assembly of parts relating to liquid discharge. The term "liquid discharge device" represents a structure including the head and a functional part(s) or mechanism combined to the head to form a single unit. For example, the "liquid discharge device" includes a combination of the head with at least one of a head tank, a carriage, a supply unit, a maintenance unit, and a main scan moving unit to form a single unit.

Examples of the "single unit" include a combination in which the head and one or more functional parts and units are secured to each other through, e.g., fastening, bonding, or engaging, and a combination in which one of the head and the functional parts and units is movably held by another. The head may be detachably attached to the functional part(s) or unit(s) each other.

For example, as a liquid discharge device, there is a liquid discharge device in which the head 404 and the head tank 441 form a single unit, as in the liquid discharge device 440 illustrated in FIG. 7. Alternatively, the head and the head tank coupled (connected) with a tube or the like may form the liquid discharge device as a single unit. A unit including a filter may be added at a position between the head tank and the head of the liquid discharge device.

In another example, the head and the carriage may form the liquid discharge device as a single unit.

In still another example, the liquid discharge device includes the head movably held by a guide that forms part of a main scan moving unit, so that the head and the main scan moving unit form a single unit. Like the liquid discharge device 440 illustrated in FIG. 8, the head 404, the carriage 403, and the main scan moving unit 493 may form the liquid discharge device 440 as a single unit.

In still another example, a cap that forms a part of the maintenance unit may be secured to the carriage mounting the head so that the head, the carriage, and the maintenance unit form a single unit to form the liquid discharge device.

Like the liquid discharge device 440 illustrated in FIG. 9, the tube 456 is connected to the head 404 mounting the head tank 441 or the channel part 444 so that the head 404 and the supply unit 494 (channel part 444, for example) form a single unit as the liquid discharge device 440.

The main scan moving unit may be a guide only. The supply unit may be a tube(s) only or a loading unit only.

The pressure generator used in the "head" is not limited to a particular-type of pressure generator. The pressure generator is not limited to the piezoelectric actuator (or a laminated piezoelectric element) described in the above-described embodiments, and may be, for example, a thermal actuator that employs an electrothermal transducer element, such as a thermal resistor, or an electrostatic actuator including a diaphragm and opposed electrodes.

The terms "image formation", "recording", "printing", "image printing", and "fabricating" used herein may be used synonymously with each other.

The above-described embodiments are limited examples, and the present disclosure includes, for example, the following aspects having advantageous effects.

[Aspect 1]

A bonded substrate (300) includes: a first substrate (200); and a second substrate (100) having a bonding surface bonded to the first substrate(200), wherein the second substrate (100) includes a recess (102) having a bottom surface (102*a*) recessed from a surface opposite to the bonding surface, and a difference between the maximum height and the minimum height of the bottom surface (102*a*) from the surface opposite to the bonding surface of the recess (102) is less than 10 μm.

A bonded substrate includes a first substrate (200) such as an actuator substrate (200) and a second substrate (100) such as a holding substrate (100) bonded to the first substrate (200). The second substrate (100) has a recess such as a common chamber (102) recessed from a surface opposite to a bonding surface to be bonded to the first substrate (200). A difference between the maximum height and the minimum height of a bottom surface (102*a*) from the surface opposite to the bonding surface of the recess (102) is less than 10 μm.

A bonding state between the second substrate (100) and the first substrate (200) is checked from the recess (102) of the second substrate (100) by an infrared transmission microscope (500). When the bottom surface (102*a*) of the recess (102) such as a concave portion is not a flat, a part of the infrared light, transmitted through the bottom surface (102*a*) of the recess (102) and reflected from the bonding portion between the second substrate (100) and the first substrate (200), is refracted at the bottom surface (102*a*) or the like and does not travel toward the imaging element of the infrared transmission microscope (500). As a result, an amount of infrared light incident on an image sensor is reduced. As illustrated in FIG. 3, an unclear portion K in which a part of the image captured by the infrared transmission microscope 500 is darkened occurs.

As a result, it may be difficult to check a bonding state such as whether air bubbles (voids) exist in the bonding portion between the first substrate 200 and the second substrate (100) from the captured image of the infrared transmission microscope 500.

In Aspect 1, a difference in height between the bottom surfaces 102*a* of the recess (102) of the second substrate (100) from the surface opposite to the bonding surface is less than 10 μm. Thus, it is possible to reduce the refraction of the infrared light reflected at the bonding portion at the bottom surface 102*a*, and to increase an amount of infrared light incident on the imaging element of the infrared transmission microscope 500.

As a result, it is possible to reduce generation of a dark portion in an image captured by the infrared transmission microscope 500. Further, it is possible to easily check the bonding portion between the first substrate (200) and the second substrate (100) from an image captured by the infrared transmission microscope 500.

[Aspect 2]

In the bonded substrate (300) according to Aspect 1, the first substrate (200) has a through hole (206), and the bottom surface (102*a*) of the recess (102) of the second substrate (100) has a communication hole (106) communicating with the through hole (206).

In Aspect 1, the first substrate (200) such as an actuator substrate (200) has a through hole (206). A second substrate (100) such as a holding substrate (100) has a communication hole (106) communicating with the through hole (206) in a bottom surface (102*a*) of a recess such as a common chamber (102).

According to Aspect 2, it is easy to check the bonding of the bonding portion between the communication hole 106 and the through hole 206 from the image captured by the infrared transmission microscope 500 across the bottom surface 102*a* of the recess (common chamber 102).

[Aspect 3]

In the bonded substrate (300) according to Aspect 2, in at least in a periphery of the communication hole (106) of the bottom surface, a difference between the maximum height and the minimum height of the bottom surface (102*a*) from the surface opposite to the bonding surface of the recess (102) is less than 10 μm.

In Aspect 2, at least the difference in height around (in at least in a periphery of) the communication hole 106 in the 102*a* of the bottom surface is 10 μm or less.

According to Aspect 3, it is possible to reduce unclear portion generated in a vicinity of the bonding portion between the communication hole 106 and the through hole 206 in the image captured by the infrared transmission microscope 500 through the bottom surface 102*a* of the recess (102). Accordingly, it is easy to check the bonding of the bonding portion between the communication hole 106 and the through hole 206 from the image captured by the infrared transmission microscope 500.

[Aspect 4]

In the bonded substrate (300) according to Aspect 3, the second substrate (100) is configured to transmit an infrared light.

In any one of Aspects 1 to 3, the second substrate such as the holding substrate 100 transmits infrared light.

According to Aspect 4, it is possible to check the bonding portion between the first substrate (200) and the second substrate (100) using the infrared transmission microscope 500 through the bottom surface 102*a* of the recess (102) of the second substrate (100) such as holding substrate 100 as described in the present embodiment.

[Aspect 5]

A piezoelectric actuator (300) includes the bonded substrate (300) according to Aspect 1.

The piezoelectric actuator 300 is manufactured from the bonded substrate according to any one of Aspects 1 to 4.

According to the sixth aspect, it is possible to obtain a highly reliable piezoelectric actuator in which the substrates are appropriately bonded to each other.

[Aspect 6]

A liquid discharge head (10) includes: the piezoelectric actuator (300) according to claim 5; and a nozzle substrate (400) having multiple nozzles (400*a*) from which a liquid is discharged.

The liquid discharge head 10 includes a nozzle substrate 400 on which a nozzle array including a plurality of nozzles for discharging liquid droplets is formed, and the piezoelectric actuator 300 according to the fifth aspect.

According to the Aspect 6, it is possible to a liquid discharge head (10) in which the first substrate (200) and the second substrate (100) are adequately and reliably bonded.

[Aspect 7]

In the liquid discharge head (10) according to Aspect 6, the first substrate (200) is bonded to the nozzle substrate (400), and the first substrate (200) having a through hole (206), includes: multiple individual chambers (204) respectively communicating with the multiple nozzles; and multiple pressure generators (201) respectively generating pressures in the multiple individual chambers (204), and the second substrate (100) includes a common chamber (102) defined by the recess (102), the common chamber (102) configured to supply a liquid to each of the multiple individual chambers (204), and the bottom surface (102*a*) of the recess (102) of the second substrate (100) has a communication hole (106) communicating with the through hole (206) to form a supply channel communicating the common chamber (102) with each of the multiple individual chambers (204).

In Aspect 6, the first substrate (200) such as the actuator substrate 200 is bonded to a nozzle substrate 400 on which a nozzle array including multiple nozzles 400*a* are formed. Liquid droplets are discharged from each of the multiple nozzles 400*a*. A liquid discharge head 10 includes multiple individual chambers 204 communicating with respective multiple nozzles 400*a* and multiple pressure generators such as piezoelectric elements 201 to respectively increase pressure in the individual chambers 204.

The multiple individual chambers 204 are formed along a nozzle array direction, and each of the multiple individual chambers 204 store a liquid. The recess (102) of the second substrate (100) such as the holding substrate 100 is a common chamber 102 to store a liquid to be supplied to each individual chamber 204. The through hole 206 of the first substrate (200) and the communication hole 106 of the second substrate (100) forms a supply channel such as a fluid restrictor 11 to supply a liquid in the recess (102) such as a common chamber 102 to the individual chamber 204.

According to the bonded substrate in Aspect 6, it is possible to reduce occurrence of leakage of the liquid from the bonding portion between the communication hole 106 and the through hole 206 described in the present embodiment. Therefore, it is possible to easily secure a channel length for obtaining a desired channel resistance as the fluid restrictor (11).

[Aspect 8]

A liquid discharge device (440) includes the liquid discharge head (10) according to Aspect 6.

A liquid discharge device (440) includes the liquid discharge head (10) according to Aspect 6 or 7.

According to the above-described configuration, the liquid discharge device (440) can highly reliably discharge a liquid while reducing the occurrence of liquid leakage.

[Aspect 9]

A liquid discharge apparatus (1000) includes the liquid discharge device (440) according to Aspect 8.

A liquid discharge apparatus includes the liquid discharge head according to Aspect 6 or 7 or the liquid discharge device according to Aspect 8.

According to the above-described configuration, the liquid discharge apparatus can highly reliably discharge a liquid while reducing the occurrence of liquid leakage.

According to the present embodiment, the bonding between the first substrate and the second substrate can be easily confirmed by an infrared transmission microscope.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head, comprising:

a piezoelectric actuator comprising a bonded substrate; and a nozzle substrate having multiple nozzles from which a liquid is discharged, wherein the bonded substrate includes a first substrate and a second substrate, the second substrate includes a recess and a bonding surface bonded to the first substrate, the recess has a bottom surface recessed from a surface opposite to the bonding surface, and a difference between a maximum height and a minimum height of the bottom surface from the surface opposite to the bonding surface of the recess is less than 10 μm.

2. The liquid discharge head according to claim 1, wherein the first substrate has a through hole, and the bottom surface of the recess has a communication hole communicating with the through hole.

3. The liquid discharge head according to claim 2, wherein in a periphery of the communication hole of the bottom surface, a difference between the maximum height and the minimum height of the bottom surface from the surface opposite to the bonding surface of the recess is less than 10 μm.

4. The liquid discharge head according to claim 3, wherein the second substrate transmits an infrared light.

5. The liquid discharge head according to claim 1, wherein the first substrate is bonded to the nozzle substrate, the first substrate, comprises:

a through hole;

multiple individual chambers respectively communicating with the multiple nozzles; and multiple pressure generators respectively generating pressures in the multiple individual chambers, the second substrate comprises a common chamber defined by the recess, the common chamber is configured to supply a liquid of individual chambers of the multiple individual chambers, and the bottom surface of the recess of the second substrate has a communication hole communicating with the through hole to form a supply channel communicating the common chamber with the multiple individual chambers.

6. A liquid discharge device comprising the liquid discharge head according to claim 1.

7. A liquid discharge apparatus comprising the liquid discharge device according to claim 6.

* * * * *